United States Patent
Pieri et al.

(10) Patent No.: US 12,411,478 B2
(45) Date of Patent: Sep. 9, 2025

(54) COMPUTING PLATFORM FOR BIOPROCESS DESIGN, EXECUTION, ANALYSIS, AND TECHNOLOGY TRANSFER

(71) Applicant: Benchling, Inc., San Francisco, CA (US)

(72) Inventors: Dane Colin Pieri, Winchester, MA (US); Liu Liu, San Francisco, CA (US); Ashutosh Singhal, San Francisco, CA (US); Lucas Zulauf, Oakland, CA (US); Swathi Sundar, San Francisco, CA (US); Vineet Gopal, San Francisco, CA (US)

(73) Assignee: Benchling, Inc., San Francisco, CA (US)

( * ) Notice: Subject to any disclaimer, the term of this patent is extended or adjusted under 35 U.S.C. 154(b) by 0 days.

(21) Appl. No.: 18/665,429

(22) Filed: May 15, 2024

(65) Prior Publication Data

US 2024/0385600 A1    Nov. 21, 2024

Related U.S. Application Data

(60) Provisional application No. 63/466,607, filed on May 15, 2023.

(51) Int. Cl.
    *G05B 19/418* (2006.01)
(52) U.S. Cl.
    CPC .............. *G05B 19/41865* (2013.01)
(58) Field of Classification Search
    None
    See application file for complete search history.

(56) References Cited

U.S. PATENT DOCUMENTS 6,041,263 A * 3/2000 Boston ............... G05B 17/02
                                                        700/62
6,952,678 B2 * 10/2005 Williams ............ G06Q 10/105
                                                        705/320

(Continued)

FOREIGN PATENT DOCUMENTS

CN    113721567 A  * 11/2021
WO    WO-0020983 A1 * 4/2000 ............ G06Q 10/06

OTHER PUBLICATIONS

Skylandanalytics.net [online], "An Introduction to Skyland PIMS," 2024, retrieved on May 16, 2024, retrieved from URL <https://skylandanalytics.net/skyland-pims-suite/>, 7 pages.

(Continued)

*Primary Examiner* — Jason Lin
(74) *Attorney, Agent, or Firm* — Fish & Richardson P.C.

(57) ABSTRACT

Methods, systems, and apparatus, including computer programs encoded on computer storage media, for a computing platform that supports bioprocess design, execution, analysis, and technology transfer. One of the methods includes receiving, by a bioinformatics platform from a production facility, a facilities specification that represents properties and capabilities of each item of equipment of a plurality of items of equipment at the production facility. A selection of a recipe to be transferred to the production facility as a production plan is received. A matching process is performed between unit operations of the selected recipe and equipment represented by the facilities specification to convert each equipment-agnostic unit operation of the recipe into an equipment-specific production task to be performed by a particular item of equipment in the production facility. A production plan is generated having a plurality of equipment-specific production tasks for the production facility.

17 Claims, 5 Drawing Sheets

(56) References Cited

U.S. PATENT DOCUMENTS

| | | | | |
|---|---|---|---|---|
| 6,968,326 | B2* | 11/2005 | Johnson | G06Q 30/02 |
| | | | | 706/14 |
| 7,392,107 | B2* | 6/2008 | Popp | G05B 23/0235 |
| | | | | 700/109 |
| 8,738,190 | B2* | 5/2014 | Pai | G06Q 10/06312 |
| | | | | 700/286 |
| 10,088,837 | B1* | 10/2018 | Strain | G05B 19/41865 |
| 10,656,628 | B2* | 5/2020 | Feiten | G05B 19/41815 |
| 10,671,035 | B2* | 6/2020 | Feiten | G05B 13/02 |
| 11,086,302 | B2* | 8/2021 | Marruchella | G06Q 10/06 |
| 11,200,031 | B2* | 12/2021 | Holbrook | G06F 8/65 |
| 11,340,876 | B2* | 5/2022 | Kim | G06N 3/045 |
| 2002/0052862 | A1* | 5/2002 | Scott | G06Q 10/087 |
| 2007/0050070 | A1* | 3/2007 | Strain | G06Q 10/06 |
| | | | | 700/99 |
| 2008/0097623 | A1* | 4/2008 | Weatherhead | G05B 19/41865 |
| | | | | 700/19 |
| 2009/0299511 | A1* | 12/2009 | Chan | G06Q 10/06 |
| | | | | 700/102 |
| 2013/0144591 | A1* | 6/2013 | Khan | G06F 30/13 |
| | | | | 703/22 |
| 2023/0168662 | A1* | 6/2023 | Stacey | G05B 17/02 |
| | | | | 700/266 |

OTHER PUBLICATIONS

International Search Report and Written Opinion in International Appln. No. PCT/US2024/029477, mailed on Sep. 4, 2024, 11 pages.

* cited by examiner

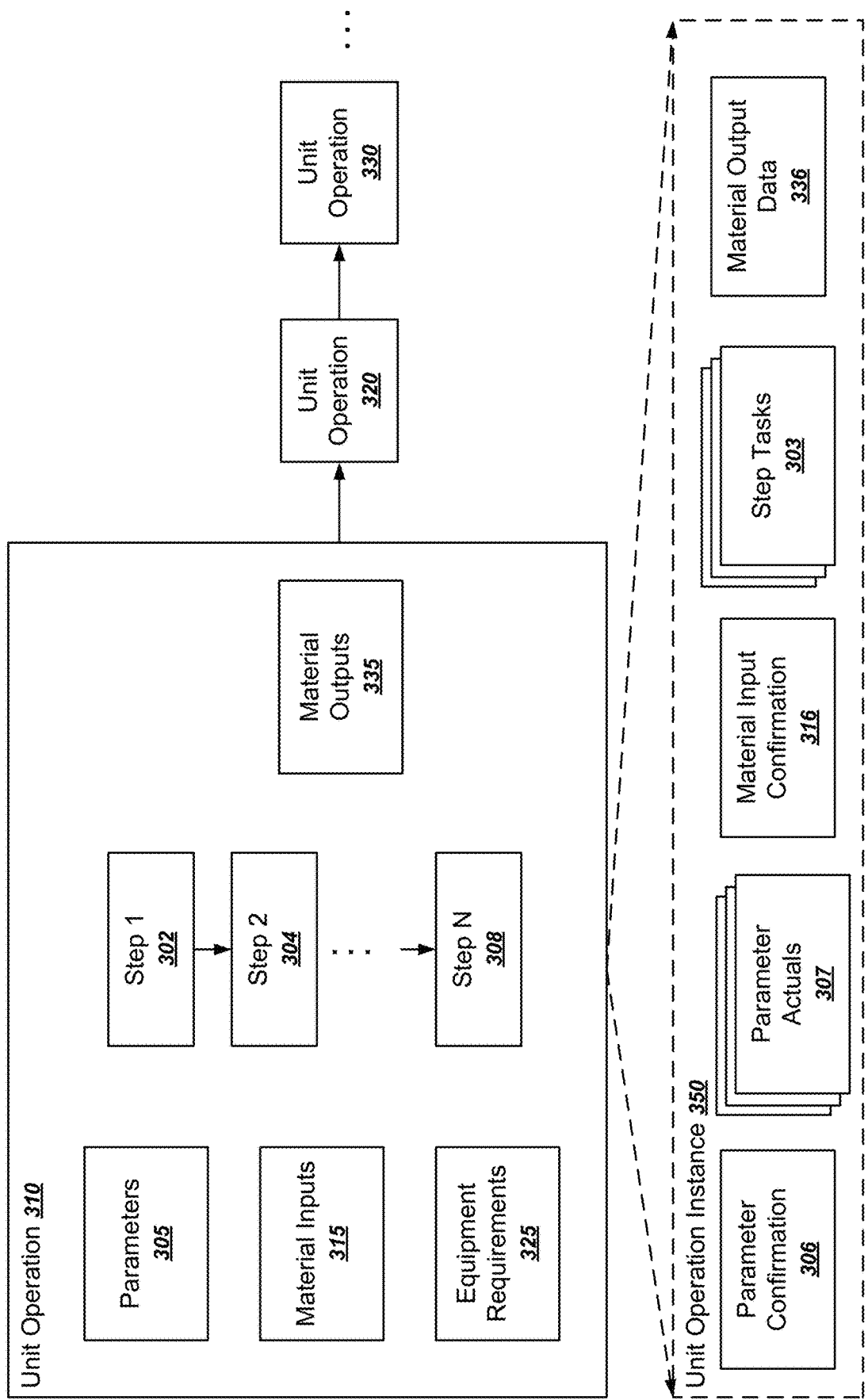

COMPUTING PLATFORM FOR BIOPROCESS DESIGN, EXECUTION, ANALYSIS, AND TECHNOLOGY TRANSFER

CROSS-REFERENCE TO RELATED APPLICATION

This application claims priority to U.S. Provisional Application No. 63/466,607, filed on May 15, 2023. The disclosure of the prior application is considered part of and is incorporated by reference in the disclosure of this application.

BACKGROUND

This specification relates to computing platforms for Bioprocess Design, Execution, Analysis, and Technology Transfer.

Life sciences products, including pharmaceuticals, vaccines, and chemical compounds, are typically developed in a development cycle by a process development team using one or more process development facilities. The development cycle may involve hundreds or thousands of experiments and trials and can take months or years of development, during which a synthesis process for making the product, testing its quality and purity, and mixing with other substances to formulate a stable product, is iteratively modified. But afterwards, life sciences products are commonly manufactured at scale by other entities, which in this specification will be referred to as production teams. The production teams typically have different personnel and production facilities that are separate and distinct from the process development team and the process development facilities. The task of modifying the final synthesis process into a format that can be used by production teams is known as technology transfer, or tech transfer for short. This task involves generating a production process that can include producing the active ingredient, e.g., through cell culture or fermentation; purifying the resulting substance; mixing with other substances into a stable product; packaging the product; possibly also steps for distribution; as well as testing intermediate substances at one or more steps to ensure quality.

Tech transfer is often a large time bottleneck and technological barrier to manufacturing life sciences products at scale. This is because the production teams usually have different equipment, different facilities, and different software than that used by the process development team. Tech transfer is thus often tedious, manual, time-consuming, and error prone. Tech transfer is also a time bottleneck for starting clinical trials because the substance needed for the clinical trial must be produced by a process substantially similar to the eventual large-scale production process. It is therefore not uncommon for the tech transfer process to take 18-24 months before the first step of manufacturing can begin, e.g., by producing a validation batch.

SUMMARY

This specification describes technologies relating to a cloud-based bioinformatics platform that provides automatic or semi-automatic bioprocess design, execution, analysis, and technology transfer capabilities. To do so, the platform provides a process design tool for designing and rapidly iterating through different versions of the process. The underlying data model, which in this specification will be referred to as a recipe, is rich enough and flexible enough that the process parameters that were input during the process design phase can be automatically translated to those used in the production phase. In addition, the tasks of the process can be automatically mapped to specifically identifiable equipment at the production facilities.

As a result, the system can automatically generate a candidate production plan from a recipe, from which production teams can then immediately use as a starting point for implementing the final production process. This is in stark contrast to conventional methods that require months of manual human design work to get to that starting point. The initial goal of the production teams is often to produce validation batches which can be used for regulatory approval, and the data modeling and automatic translation capabilities described in this specification speed up that process by orders of magnitude.

Particular embodiments of the subject matter described in this specification can be implemented so as to realize one or more of the following advantages. The techniques described in this specification allow a process developed in a process development facility to be automatically exported as part of a candidate production process to be executed in a production facility. This capability dramatically reduces the time required to produce validation batches and to manufacture life sciences products. These technologies also increase the chances that the production teams correctly produce the product the first time, avoiding the costly steps of re-engineering the production process several times before correctly producing the first validation batch. In addition, the process can be exported for multiple different types of production facilities, which greatly reduces redundant and duplicated efforts to generate production plans. The recipes that are used to represent process designs essentially standardize the representation across all process development facilities and production facilities so that automatically translating between these different domains becomes possible. The techniques described in this specification also provide for easy scientific and engineering analysis of 1) multiple batches within a single experiment, and 2) batches produced at different times as part of different experiments, by automatically generating analysis-ready datasets tailored to the needs of a process development scientist.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B illustrates a unit operation instance.

Like reference numbers and designations in the various drawings indicate like elements.

DETAILED DESCRIPTION

Figure 1:
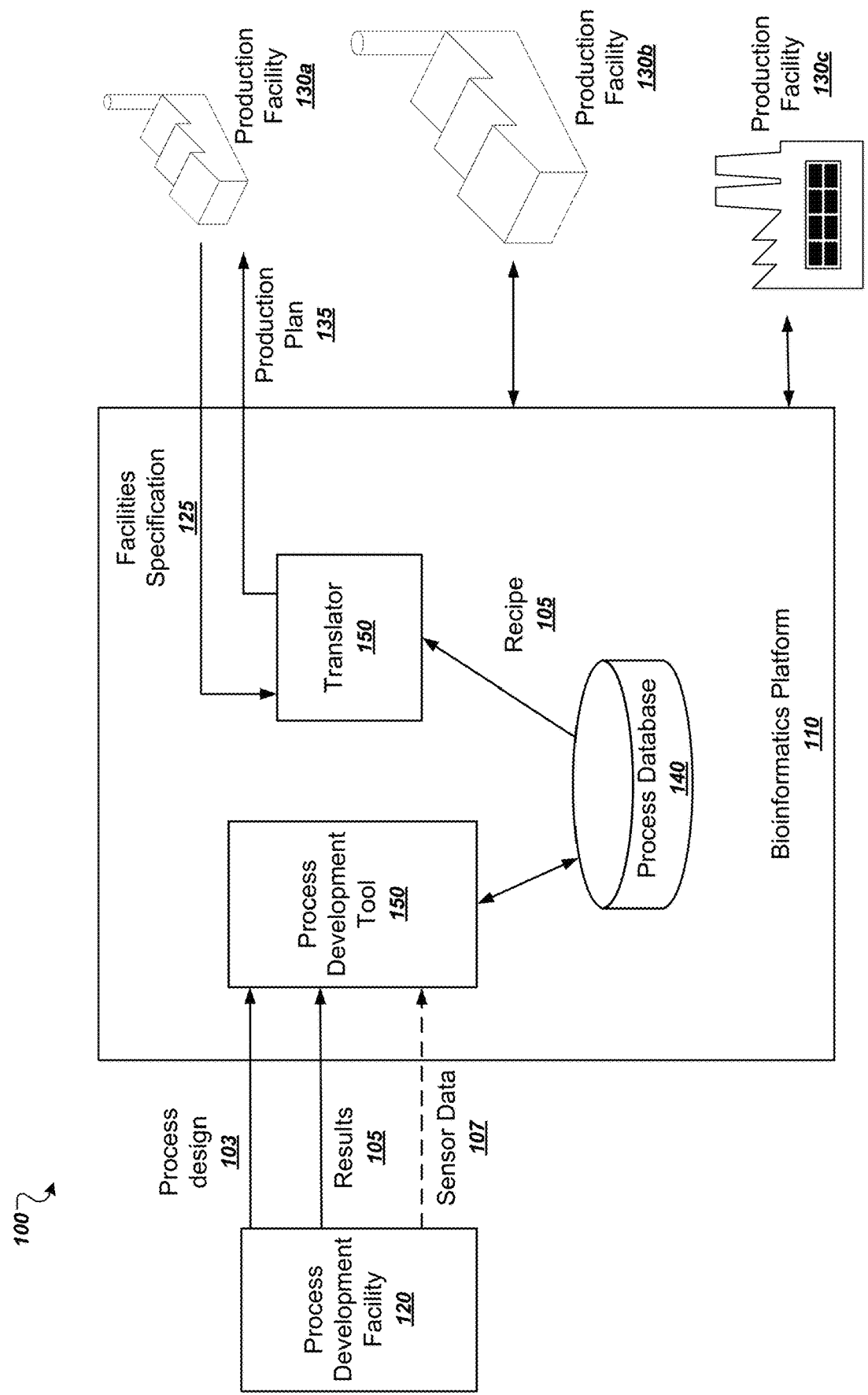
FIG. 1 is a diagram that illustrates an example system.

FIG. 1 is a diagram that illustrates an example system 100. The system 100 includes a bioinformatics platform 110 in communication with a process development facility 120 and three production facilities 130*a*, 130, and 130*c*. The system 100 is an example of a system that can implement the techniques described in this specification.

The bioinformatics platform 110 is a cloud-based computing system that executes on a distributed system of one or more computers. The platform 110 communicates with the process development facility 120 and the production facilities 130a-c by communicating with computing devices installed at or associated with those facilities. The bioinformatics platform 110 can communicate with any appropriate computing device at those facilities, including mobile phones, laptop, tablet, or desktop computers, or some combination of these.

The process development facility 120 is a site that uses the bioinformatics platform 110 to design and track in-development processes occurring at the at process development facility 120. For example, the process development facility 120 can include a lab for designing processes for drug synthesis, gene editing, or any other appropriate life sciences process.

The process development facility 120 communicates with a process development tool 150 hosted by the platform 110. The process development tool 150 can be implemented as a cloud-based application that provides a user interface for users at process development facilities. Alternatively or in addition, some or all of the process development tool 150 can be installed locally on devices at the process development facility 120.

In operation, the process development facility can interact with the process development tool 150 to design different variations of a process. In this specification, each variation can be referred to as a recipe variant. For example, the process development tool 150 can automatically or with some process-design user input 103 generate multiple different recipe variants with different variations of their process parameters.

In this specification, a recipe is a data model that comprehensively represents a life sciences process. A recipe includes a set of unit operations that can be executed in order to perform the process. Such processes often involve making, purifying, or testing materials in a laboratory.

Recipes have parameters from which process variations can be generated by varying parameters of the recipe. In this specification, each distinct variation of a recipe will be referred to as a recipe variant. A recipe variant is thus another recipe that captures modifications in parameters from an original recipe.

Each unit operation is data that represents a subset of a process that transforms a material input to a material output. A unit operation can represent a physical transformation, a chemical transformation, or both. In general, the parameters of a unit operation can be modified without impacting other unit operations in a recipe. A recipe typically includes at least one sequence of unit operations. A recipe can however include multiple sequences of unit operations or any appropriate directed graph of unit operations.

Each unit operation defines one or more steps to be performed. Each step represents an action to be performed as well as whether and what type of data to be recorded after the step is completed.

Steps of a unit operation can include pre-run actions that prepare for the unit operation transformation. For example, a unit operation can define checks to be performed, equipment settings that need to be set, or any other appropriate actions to satisfy initial conditions of the unit operation, e.g., a material reaching a particular temperature.

Steps of a unit operation can also include one or more run actions that represent the actions of the core transformation. For example, run actions can include performing a chemical reaction, mixing materials, or any other appropriate transformation action.

Steps of a unit operation can also include one or more post-run actions that close down the unit operation after the transformation has been performed. For example, post-run actions can include actions for clean-up, data recordation, and results of post-transformation analysis, to name just a few examples.

Each unit operation can also define equipment requirements needed to perform steps of the unit operation. In order to provide greater flexibility, the equipment requirements of a unit operation can be equipment-agnostic. In other words, the unit operation can specify required capabilities or properties of equipment needed to perform the unit operation, but without specifying a particular device or machine or a particular model or name of a machine. In this way, the recipe can remain untethered to the particular environment of the process development facility.

In this specification, a batch refers to the execution of all unit operations of a recipe. All data generated during execution of a batch is stored as a batch record. Each batch record includes unit operation instances that include data generated from executing unit operations of a recipe.

As process development teams can execute batches in the lab at the process development facility 120 for each of multiple recipe variants, process parameters of each designed recipe variant can be automatically generated as batch records in a process database 140.

The process development facility 120 can provide batch results 105 to the process development tool 150, which can represent what parameters were actually used and what actually happened during execution of the batch as well as the properties of any resulting or intermediate materials used or produced. The batch results 105 can record what operators did as they did it, as well as results of analytical tests, e.g., assays, performed on samples taken of the material as it is produced. The platform 110 can then store the batch results 105 in the process database 140 in association with the process parameters used for the batch.

The process development facility 120 can optionally also upload sensor data 107 for each batch to record actual sensor data 107 from execution of a batch. The actual conditions that occurred during execution of a batch can often differ from the process parameters of the initially designed recipe. Data about executed batches can be converted to and exported in analysis-ready datasets to support the scientific analysis required to assess and compare the relative performance of batches, and their corresponding recipe variants, on dimensions such as productivity or quality. The standardized recipe data model makes these comparisons easier and more intuitive. Such comparisons can include comparing multiple batches within an experiment, or batches performed at different times in different experiments.

The recipe data model described in this specification is rich enough that it can be used to automatically translate a recipe variant for a batch that was executed by the process development facility 120 into a production plan that allows a production facility to accurately reproduce the results of the batch.

To support this functionality, the bioinformatics platform 110 can automatically modify process parameters received from the process development facility into a standardized, equipment-agnostic format. This can involve converting units between measurement systems. This can also involve automatically filling in implicit information from a batch. For example, a process development team can design a series of recipe variants that uses a particular mixer type. However, to support the rapid iterative environment of process development, the process development tool 150 need not require explicit user input to capture all relevant attributes of the mixer. Rather, the platform 110 can automatically retrieve and store that information in the process database in association with batch records of batches that used the mixer. For example, the platform 110 can automatically fill in a parameter regarding the mixer capacity.

Once the process development team settles on a particular recipe variant as the process that needs to be mass produced in production facilities, the team can use the process development tool to designate the recipe variant as ready for production in one or more production facilities.

In order to translate a recipe variant into a production plan, the platform 110 can use a translator 150 that takes as input a facilities specification 125 that is specific to a particular production facility. For example, the facilities specification 125 can indicate what equipment is available for use at the production facility as well as what materials are available at the production facility.

The platform 110 can then use a translator 150 that takes as input a recipe and a facilities specification for a production facility and produces a candidate production plan for the facility. The translator 150 can be a computer-implemented subsystem having installed software that is configured to automatically perform a translation from a recipe and a facilities specification into an equipment-specific production plan.

Each production plan 135 can specify an ordering of a plurality of production tasks as well as parameters and configuration data for each production task. The production tasks are actions that are sufficient to effectuate the results of each unit operation of the recipe. Unlike the equipment-agnostic nature of the unit operations of a recipe, each production task is equipment-specific. In addition, steps of unit operations represented by the recipe can be translated into production tasks that are assigned to be performed by specifically identifiable equipment in the facilities specification. This process essentially translates process tasks into production tasks.

The facilities specification 125 can specify information representing equipment at a production facility, materials available at a production facility, or both. For example, the facilities specification 125 can include the capabilities of different pieces of equipment, e.g., the volume, temperature range, and mixing speed range, to name just a few examples. In some implementations, the translator 150 can automatically populate implicit information in the facilities specifications 125. For example, the translator can be configured with tables of commonly used lab equipment as well as their properties. Therefore, the facilities specification 105 need not specify all attributes and capabilities of all lab equipment, but rather only needs to identify the type of equipment. The translator 150 can populate the rest of the information automatically.

In some implementations, the production facilities 130a-c communicate with the platform 110 to provide actual performance data for their equipment. The performance data can represent deviations that have occurred in the past. For example, the performance data can indicate that a particular piece of equipment runs at 24.9 degrees Celsius when set at 25.0 degrees Celsius. Then, when generating a production plan, the translator 150 can automatically account for one or more deviations in the production facility equipment.

To generate the production plan, the translator 150 can perform a matching process between unit operations represented by a recipe and equipment represented by a facilities specification. For example, the translator 150 can first perform a search process to find a minimally sufficient set of equipment having the capabilities to perform each unit operation in the recipe. The translator 150 can optionally perform an optimization process in order to maximize the efficiency of the resulting production plan. For example, larger pieces of equipment can have a higher operating cost associated with them, which can cause the translator 150 to select equipment that is cheaper to run while still meeting the requirements of the recipe.

The production teams at the production facilities can then use the candidate production plans generated by the translator 150 to begin testing. The production teams can review one or more candidate production plans generated by the translator 150 as a starting point for the production process. In some implementations, the production teams can specify user input confirming or rejecting some or all steps of the candidate production plan. A final production plan can be produced when the production teams have confirmed all steps of the candidate production plan.

Often, the first testing step is to execute a validation batch in order to verify that the production plan produces the same materials as the process designed by the process development facility. Therefore, in some implementations the translator 150 can generate two production plans: a validation production plan that tests the process on a smaller scale, as well as a full production plan that scales up the output of the production process.

In some implementations, the bioinformatics platform 110 can monitor execution of the production plan at the production facility. This can be useful information for process development teams to evaluate selected recipes. In some cases, a process that was successful in process development is not successful in production. Therefore, process development teams can further modify the process in order to seek a recipe variant that succeeds in production.

As part of this iterative and exploratory process, the question often arises whether a particular process variation has been tried before. In conventional life sciences labs, this question often relies on the collective memories and experience of the process development teams.

However, having a process database 140 that stores the rich data of recipe variants and batches can eliminate this guess work. In particular, users at the process development facility can query the process database 140 with parameters of a proposed process, and the bioinformatics platform 110 can provide query results for all matching recipe variants having those parameters as well as their corresponding batch records. The query need not specify all parameters of a process, but the bioinformatics platform 110 can provide a listing of all batch records matching the parameters of the query. In this way, the process development teams can efficiently explore the space of process design and avoid redundant work.

This way of connecting but still separating the domains of process development and production maintains the goals of both domains. In particular, process development teams can continue to quickly iterate without worrying about the tedious record keeping of parameters that will become more important in a production environment. And production teams need not worry about a detailed understanding of terminology or facility-specific attributes of the process development facility or vice versa. Rather, the output that is received by the production teams is already tailored to the equipment and materials at their facility. Thus, the production teams can immediately begin configuring the lab to run a validation batch, which can save months of time in the overall process of mass producing life sciences products.

In addition, the platform 110 also greatly reduces redundancy in generating production plans. For example, if the production facility 130c is a newly built manufacturing facility, the platform 110 can automatically generate a new candidate production plan based for the new facility on its facilities specification. This is vastly more efficient than previous approaches that required production teams to spend months analyzing the designed process and the capabilities of the production facility to manually determine how best to replicate the designed process.

Figure 2:
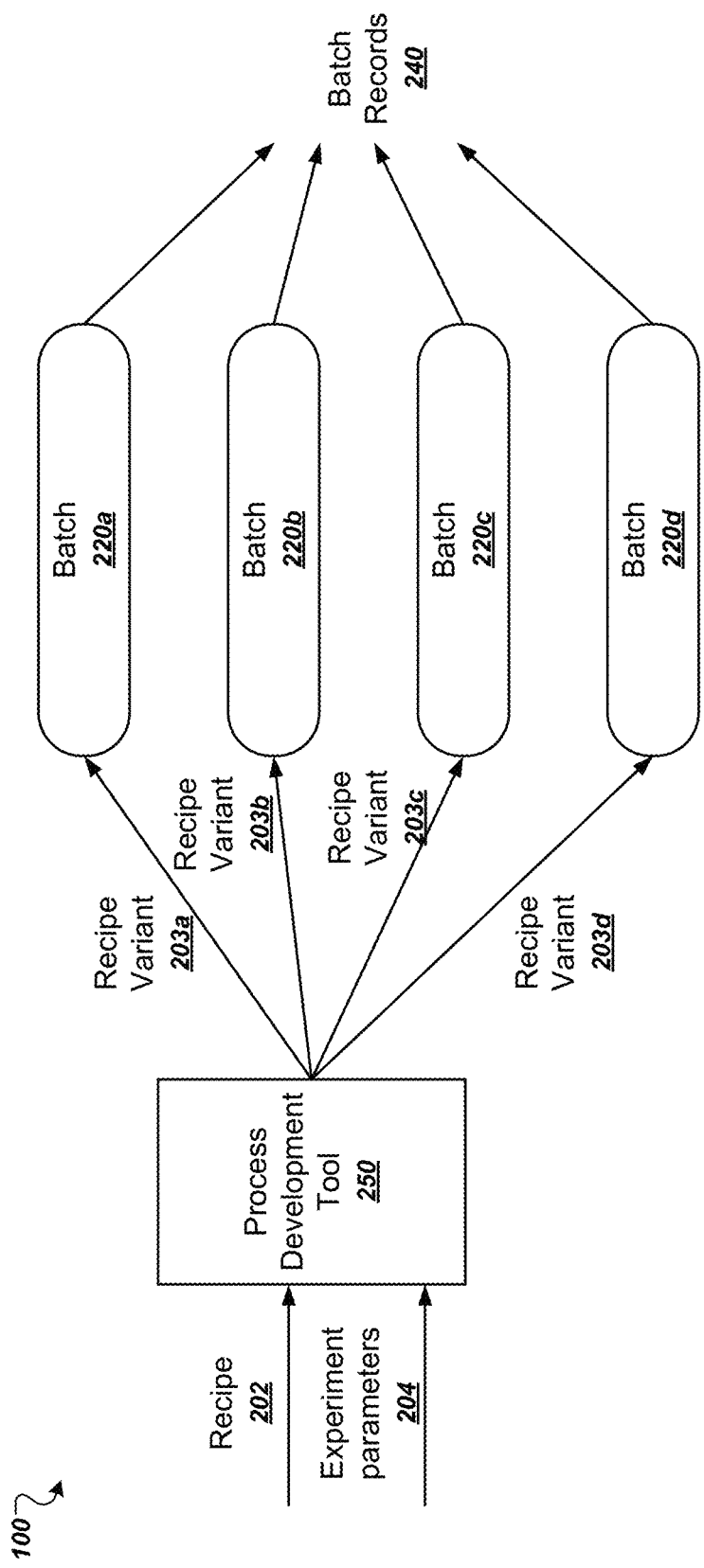
FIG. 2 illustrates the design of recipe variants.

FIG. 2 illustrates the design of recipe variants. The example in FIG. 2 illustrates how recipe variants 203a-d can be generated from an input recipe 202 and experiment parameters 204.

The experiment parameters 204 can be specified by a process designer and indicate how recipe variants should be generated from the original input recipe 202. For example, the experiment parameters can indicate four different setpoints for a pH value used during a particular unit operation of the recipe 202. The process development tool 250 can then automatically generate the recipe variants 203a-d that reflect the different pH setpoints.

Each recipe variant 203a-d can then be executed as a batch. Thus, the four recipe variants 203a-d are executed as batches 220a-d. Each batch involves performing the unit operations of the corresponding recipe variant to generate a material output.

The batches are typically performed in a laboratory, with the process development tool 250 guiding their execution. For example, at each step of each unit operation, the process development tool can generate or provide a user interface presentation that specifies parameters of the step. And after each step of each unit operation is performed, the process development tool can record data used for the step, e.g., a temperature setting, as well as data generated by the step, e.g., temperature actually used. The data can be recorded manually or automatically, e.g., by the process development tool 250 receiving sensor readings or other data streams from laboratory equipment.

Figure 3A:
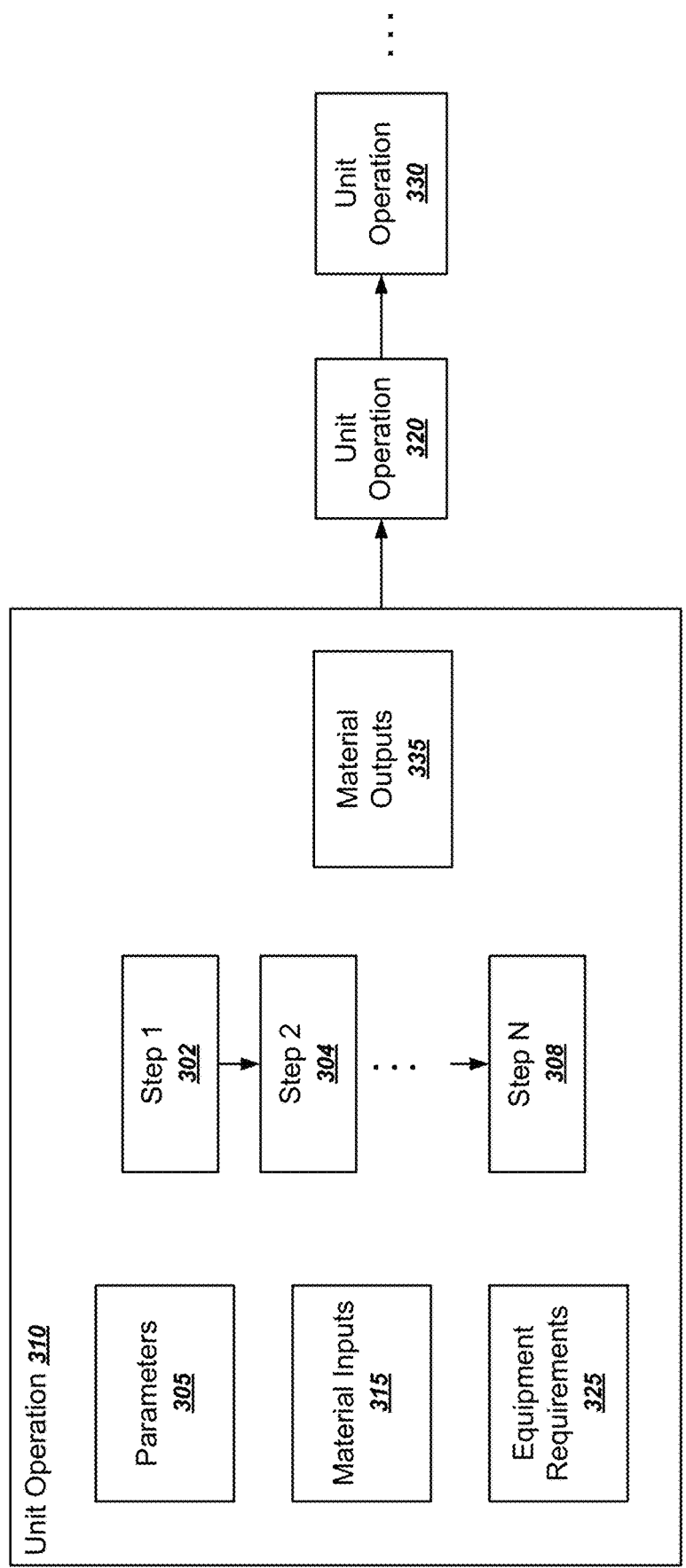
FIG. 3A is an illustration of a sequence of unit operations.

FIG. 3A is an illustration of a sequence of unit operations 310, 320, and 330. As described above, each unit operation is a portion of a recipe that represents the transformation of a material input to a material output. Changes to a unit operation do not affect the steps of any other unit operation.

The power and flexibility of the recipe data model described in this specification comes in part from all unit operations having the same data model. In other words, different types of transformations need not have transformation-specific data models. As a result many of the data fields described below are optional.

In general, unit operations have the following primary categories of data: parameters 305, material inputs 315, equipment requirements 325, material outputs 335, and steps, e.g., 302, 304, through 306.

Each parameter 305 has one or more fields to represent the conditions to be used for execution of the unit operation. For example, temperature and pH settings are example parameters. Parameters 305 can for example have fields including a parameter name, a type, a setpoint, a unit, a minimum, a maximum, and a description, to name just a few examples.

Each material input 315 has one or more fields to represent the materials that are used for the unit operation. Material inputs 315 can for example have fields including a name, a type, a parent entity from which the material was derived, a child entity, a quantity, a unit, and a description, to name just a few examples.

Each equipment requirement 325 can have fields to represent features or capabilities of equipment needed to execute the unit operation. Equipment requirements 325 can have fields including a name, a capability, a size, and a description.

Each step, e.g., step 302, can have fields to represent an action to be performed to execute part of the unit operation. Typically each step is linked to one or more other steps. For example, the steps can use links to represent preceding and following steps. In some implementations, each step can specify an electronic notebook template to be used to record results of the step during execution.

Each material output 335 has one or more fields to represent a material produced by executing the unit operation 310. Material outputs 335 can for example have fields including a name, a material output schema, and a description.

A process development tool can parse the definition of a unit operation in order to provide instructions in a laboratory setting. For example, the process development tool can generate information that describes the parameters, materials, and equipment needed to execute the unit operation. The process development tool can also step through the steps 302-306 and can display instructions for each step.

FIG. 3B illustrates a unit operation instance 350. A unit operation instance 350 is a collection of data generated from the execution of a unit operation 310. Each generated unit operation instance 350 can be added to a batch record for a particular batch of a recipe.

In general, a process development tool can generate the unit operation instance as the unit operation is executed in the laboratory. For example, after each step or after at particular points of time during execution of the unit operation, the process development tool can automatically generate data for populating the unit operation instance.

From the parameters 305, the process development tool generates a parameter confirmation 306 that represents the settings that an operator confirmed at the start of execution of the unit operation. For example, the parameter confirmation 306 can record the temperature and pH setpoints conditions for initiating the unit operation.

From the parameters 305, the process development tool can also record parameter actuals 307 that represent the actual values of each of the parameters. And because such parameters can change over the course of a unit operation, the process development tool can automatically generate parameter actuals 307 at each of a multiple different time points. For example, the process development tool can generate parameter actuals 307 at every 1 second, 5 seconds, or 100 seconds of a unit operation, to name just a few examples. As an example, a thermometer or a probe can generate the actual temperature used for a particular unit operation, and the process development tool can record those values that actually occurred during the batch.

From the material inputs 315, the process development tool can generate a material input confirmation 316 that represents the confirmed material inputs to the unit operation.

From the steps 302-308, the process development tool can generate step tasks 303. Each step task 303 represents the performance of an action by an actor in the laboratory. Thus, each step task 303 can record to whom the action was assigned, a time stamp that the action was performed or initiated, as well as a status of the action. For example, an action can be incomplete, complete, failed, or successful, to name just a few examples.

From the material outputs 335, the process development tool can generate material output data 336 that represents properties of the material produced by the unit operation. The material output data 336 can for example fill in the fields of material output schema, e.g., regarding quantity, which containers hold the material, or any other appropriate property of the output material.

Figure 4:
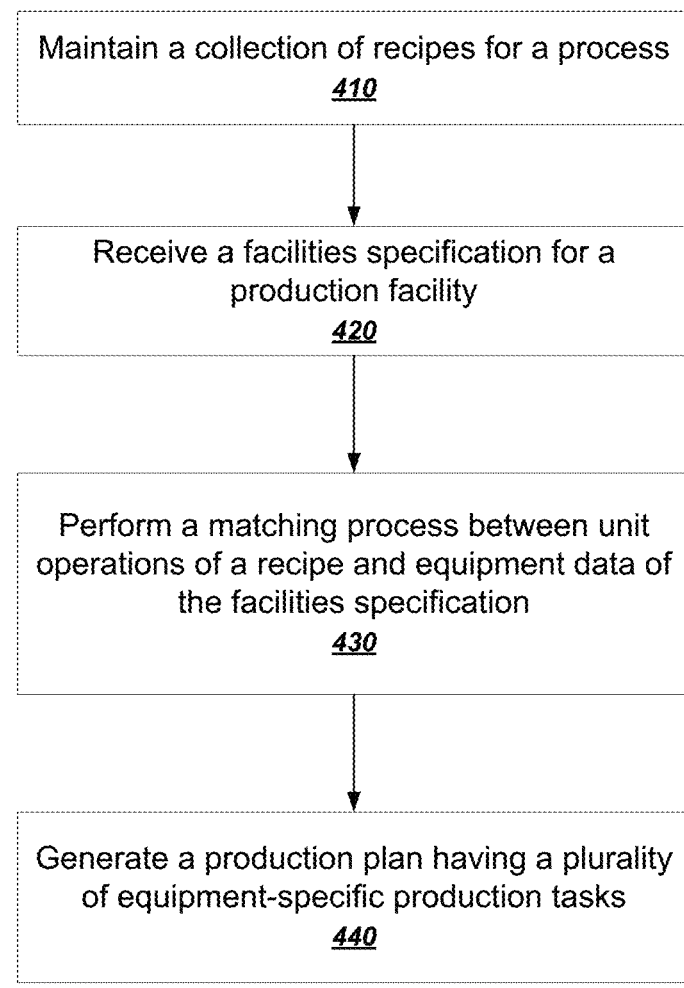
FIG. 4 is a flowchart of an example process for translating a recipe into a production plan.

FIG. 4 is a flowchart of an example process for translating a recipe into a production plan. The process is an example of how the recipe modeling techniques described in this specification can be used to automate the task of technology transfer. The example process can be performed by a system of one or more computers in one or more locations, e.g., a bioinformatics platform programmed in accordance with this specification. The example process will be described as being performed by a system of one or more computers.

The system maintains a collection of recipes (410). As described above, the system can include a process development tool that can be used to modify and automatically generate recipes. In a typically process development environment, process design teams continually iterate to create and refine recipes in the context of an experiment. In such experiments, a scientist can make targeted tweaks to the recipe using the process design tool, which can then generate recipe variants. The recipe variants can be executed sequentially or side-by-side in order to compare the recipe variants for a particular outcome to be optimized or improved, e.g., speed, productivity, purity, consistency, quality, reliability, robustness, to name just a few examples. The recipes described in this specification provide a structured framework to streamline and automate aspects of this exploratory process.

For example, after executing batches corresponding to the recipe variants, scientists can perform analysis on data generated in the resulting batch records in order to decide which recipe variant was best suited for the process at hand. In addition, a scientist can use the results of the batches to make changes to the base recipe that was used as input to the experiment design process. Because of the standardization of the recipe data model, the batch records can be used to populate analysis-ready datasets, essentially templatizing the analysis process itself. The structure imposed by the recipe data model makes it easy and intuitive to locate the data that is relevant to a particular analysis technique.

The system receives a facilities specification for a production facility (420). When a recipe variant has been produced that is sufficiently advanced to move to a production phase, the recipe variant can be used to automatically generate a production plan for a particular facility. As described above, the facilities specification can indicate the types, quantity, and other characteristics of equipment at the production facility.

In some implementations, the bioinformatics platform can provide a user interface through which a standardized data model of production equipment can be populated by users at the production facility. For example, users at the production facility can provide information corresponding to a facilities equipment data model maintained by the bioinformatics platform. Alternatively or in addition, the bioinformatics platform can publish information regarding the types of data needed for a sufficiently complete facilities specification, and productions teams at the production facility can generate facilities specification files that adhere to the published information. The bioinformatics platform can then ingest and parse the facilities specification in order to maintain data about equipment available at the production facility.

The system performs a matching process between unit operations of a recipe and equipment data of the facilities specification (430). For example, the selected recipe can be a recipe selected by scientists of the process development teams as a recipe that is ready for mass production.

In order to perform the matching process, the system can for example step through all unit operations of the selected recipe, examining the equipment requirements for each unit operation. As one example, the equipment requirements of a unit operation can specify a container size or a temperature capability for a mixer or a fermentation tank. The system can then iterate through equipment represented by the facilities specification in order to identify specific equipment at the production facility that satisfy the equipment requirements of the unit operation.

If there are any unit operations for which satisfactory equipment cannot be identified in the facilities specification, the system can provide an error message or notification regarding the unit operation and its equipment requirements. If on the other hand all unit operations have been matched to satisfactory equipment at the production facility, the system can generate a notification that the match process succeeded.

The system generates a production plan having a plurality of equipment-specific production tasks (440). After identifying satisfactory equipment at the production facility for all unit operations of the selected recipe, the system can automatically generate production tasks in order to implement the process. Unlike unit operations of a recipe, the production tasks specify information about which particular piece of equipment at the production facility is being used. The production tasks generally specify an ordering of actions that corresponds to the ordering of the unit operations of the recipe. However, some process tasks may be executed concurrently or in a different order if there is no equipment or material conflict.

In addition to the tech transfer capabilities described above, the recipe data model described in this specification can be used entirely within a process development facility to rapidly and easily iterate on process designs. The structure of the data makes the analysis part of process design automatable and easy to implement. Meanwhile, the flexibility of the recipe data model makes it suitable for virtually any life sciences process.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving, by a bioinformatics platform though a user interface of a process development tool in communication with a process development facility, user input specifying process design parameters that specify a plurality of variations of a process for transforming one or more input materials into one or more output materials;
storing, by the bioinformatics platform, each variation of the plurality of variations of the process as a recipe;
receiving, by the bioinformatics platform from a production facility, a facilities specification that represents properties and capabilities of each item of equipment of a plurality of items of equipment at the production facility;
receiving a selection of a recipe to be transferred to the production facility as a production plan;
performing a matching process between unit operations of the selected recipe and equipment represented by the facilities specification to convert each equipment-agnostic unit operation of the recipe into an equipment-specific production task to be performed by a particular item of equipment in the production facility; and
generating a production plan having a plurality of equipment-specific production tasks for the production facility.

Embodiment 2 is method of embodiment 1, further comprising providing the production plan to the production facility.

Embodiment 3 is the method of embodiment 2, further comprising:
monitoring, by the bioinformatics platform, execution of the production plan by the production facility; and
recording an indication with the recipe representing whether the selected recipe succeeded in production.

Embodiment 4 is the method of any one of embodiments 1-3, further comprising:
receiving, by the bioinformatics platform, results for one or more executed variations of the process; and
storing the received results in association with a respective recipe variant representing each executed variation of the process.

Embodiment 5 is the method of any one of embodiments 1-4, further comprising:
receiving, by the bioinformatics platform, sensor data representing actual recorded observations of an executed variation of the process; and
storing the received sensor data in association with a respective recipe variant representing each variation of the process.

Embodiment 6 is the method of any one of embodiments 1-5, wherein performing the matching process comprises:
performing a search process using the facilities specification to generate a minimally sufficient set of equipment for performing each production task.

Embodiment 7 is the method of embodiment 6, further comprising performing an optimization process to identify a sufficient set of equipment having the lowest cost of operation.

Embodiment 8 is a system comprising: one or more computers and one or more storage devices storing instructions that are operable, when executed by the one or more computers, to cause the one or more computers to perform the method of any one of claims 1 to 7.

Embodiment 9 is a computer storage medium encoded with a computer program, the program comprising instructions that are operable, when executed by data processing apparatus, to cause the data processing apparatus to perform the method of any one of claims 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:
1. A computer-implemented method comprising:
receiving, by a bioinformatics platform though a user interface of a process development tool in communication with a process development facility, user input specifying process design parameters that specify a plurality of variations of a process for transforming one or more input materials into one or more output materials;
generating a plurality of respective recipes for the plurality of variations of the process according to the process design parameters, including automatically converting one or more parameter values of each recipe into a standardized, equipment-agnostic format;

receiving, by the bioinformatics platform from a production facility, a facilities specification that represents properties and capabilities of each item of equipment of a plurality of items of equipment at the production facility;

receiving a selection of a recipe of the plurality of generated recipes representing a variation of the plurality of variations of the process generated by the process development tool of the process development facility to be transferred to the production facility;

performing a matching process between unit operations of the selected recipe and equipment represented by the facilities specification to convert each value in the standardized, equipment-agnostic format of one or more unit operations of the recipe into an equipment-specific production task to be performed by a particular item of equipment in the production facility;

generating a production plan having a plurality of equipment-specific production tasks for the production facility; and providing the generated production plan to the production facility, wherein equipment of the production facility is operated in accordance with the production plan.

2. The method of claim 1, further comprising:
monitoring, by the bioinformatics platform, execution of the production plan by the production facility; and
recording an indication with the recipe representing whether the selected recipe succeeded in production.

3. The method of claim 1, further comprising:
receiving, by the bioinformatics platform, results for one or more executed variations of the process; and
storing the received results in association with a respective recipe variant representing each executed variation of the process.

4. The method of claim 1, further comprising:
receiving, by the bioinformatics platform, sensor data representing actual recorded observations of an executed variation of the process; and
storing the received sensor data in association with a respective recipe variant representing each variation of the process.

5. The method of claim 1, wherein performing the matching process comprises:
performing a search process using the facilities specification to generate a minimally sufficient set of equipment for performing each production task.

6. The method of claim 5, further comprising performing an optimization process to identify a sufficient set of equipment having the lowest cost of operation.

7. A system comprising:
one or more computers and one or more storage devices storing instructions that are operable, when executed by the one or more computers, to cause the one or more computers to perform operations comprising:
receiving, by a bioinformatics platform though a user interface of a process development tool in communication with a process development facility, user input specifying process design parameters that specify a plurality of variations of a process for transforming one or more input materials into one or more output materials;
generating a plurality of respective recipes for the plurality of variations of the process according to the process design parameters, including automatically converting one or more parameter values of each recipe into a standardized, equipment-agnostic format;

receiving, by the bioinformatics platform from a production facility, a facilities specification that represents properties and capabilities of each item of equipment of a plurality of items of equipment at the production facility;

receiving a selection of a recipe of the plurality of generated recipes representing a variation of the plurality of variations of the process generated by the process development tool of the process development facility to be transferred to the production facility;

performing a matching process between unit operations of the selected recipe and equipment represented by the facilities specification to convert each value in the standardized, equipment-agnostic format of one or more unit operations of the recipe into an equipment-specific production task to be performed by a particular item of equipment in the production facility;

generating a production plan having a plurality of equipment-specific production tasks for the production facility; and providing the generated production plan to the production facility, wherein equipment of the production facility is operated in accordance with the production plan.

8. The system of claim 7, wherein the operations further comprise:
monitoring, by the bioinformatics platform, execution of the production plan by the production facility; and
recording an indication with the recipe representing whether the selected recipe succeeded in production.

9. The system of claim 7, wherein the operations further comprise:
receiving, by the bioinformatics platform, results for one or more executed variations of the process; and
storing the received results in association with a respective recipe variant representing each executed variation of the process.

10. The system of claim 7, wherein the operations further comprise:
receiving, by the bioinformatics platform, sensor data representing actual recorded observations of an executed variation of the process; and
storing the received sensor data in association with a respective recipe variant representing each variation of the process.

11. The system of claim 7, wherein performing the matching process comprises:
performing a search process using the facilities specification to generate a minimally sufficient set of equipment for performing each production task.

12. The system of claim 11, wherein the operations further comprise performing an optimization process to identify a sufficient set of equipment having the lowest cost of operation.

13. One or more non-transitory computer storage media encoded with computer program instructions that when executed by one or more computers cause the one or more computers to perform operations comprising:
receiving, by a bioinformatics platform though a user interface of a process development tool in communication with a process development facility, user input specifying process design parameters that specify a plurality of variations of a process for transforming one or more input materials into one or more output materials;

generating a plurality of respective recipes for the plurality of variations of the process according to the process design parameters, including automatically converting one or more parameter values of each recipe into a standardized, equipment-agnostic format;

receiving, by the bioinformatics platform from a production facility, a facilities specification that represents properties and capabilities of each item of equipment of a plurality of items of equipment at the production facility;

receiving a selection of a recipe of the plurality of generated recipes representing a variation of the plurality of variations of the process generated by the process development tool of the process development facility to be transferred to the production facility;

performing a matching process between unit operations of the selected recipe and equipment represented by the facilities specification to convert each value in the standardized, equipment-agnostic format of one or more unit operations of the recipe into an equipment-specific production task to be performed by a particular item of equipment in the production facility;

generating a production plan having a plurality of equipment-specific production tasks for the production facility; and providing the generated production plan to the production facility, wherein equipment of the production facility is operated in accordance with the production plan.

14. The one or more computer storage media of claim 13, wherein the operations further comprise:
monitoring, by the bioinformatics platform, execution of the production plan by the production facility; and
recording an indication with the recipe representing whether the selected recipe succeeded in production.

15. The one or more computer storage media of claim 13, wherein the operations further comprise:
receiving, by the bioinformatics platform, results for one or more executed variations of the process; and
storing the received results in association with a respective recipe variant representing each executed variation of the process.

16. The one or more computer storage media of claim 13, wherein the operations further comprise:
receiving, by the bioinformatics platform, sensor data representing actual recorded observations of an executed variation of the process; and
storing the received sensor data in association with a respective recipe variant representing each variation of the process.

17. The one or more computer storage media of claim 13, wherein performing the matching process comprises:
performing a search process using the facilities specification to generate a minimally sufficient set of equipment for performing each production task.

* * * * *